United States Patent [19]

Koike et al.

[11] Patent Number: 4,774,586
[45] Date of Patent: Sep. 27, 1988

[54] INTERLINE TYPE CHARGE TRANSFER IMAGING DEVICE

[75] Inventors: Norio Koike, Suginami; Masaaki Nakai, Tokorozawa; Kenji Itoh, Katsuta; Toshiyuki Akiyama, Kodaira; Iwao Takemoto, Nishitama; Shinya Oba, Tsukui, all of Japan

[73] Assignee: Hitachi, Ltd., Tokyo, Japan

[21] Appl. No.: 768,113

[22] Filed: Aug. 21, 1985

[30] Foreign Application Priority Data

Aug. 24, 1984 [JP] Japan ................ 59-174923

[51] Int. Cl.⁴ ............................. H04N 3/14
[52] U.S. Cl. .................. 358/213.29; 358/213.22; 357/30; 357/24
[58] Field of Search ........... 358/213.22, 213.26, 358/213.29, 213.31; 357/24 LR, 30 D, 30 H

[56] References Cited

U.S. PATENT DOCUMENTS

| | | | |
|---|---|---|---|
| 4,514,765 | 4/1985 | Miyata et al. | 358/213.22 |
| 4,559,550 | 12/1985 | Koike et al. | 357/24 |
| 4,617,595 | 10/1986 | Berger | 358/213.26 |
| 4,620,231 | 10/1986 | Kosonocky | 358/213.26 |
| 4,638,362 | 1/1987 | Oshima et al. | 358/213.26 |
| 4,656,519 | 4/1987 | Savoye | 357/24 LR |
| 4,689,687 | 8/1987 | Koike et al. | 358/213.29 |

FOREIGN PATENT DOCUMENTS

| | | |
|---|---|---|
| 3104489 | 12/1981 | Fed. Rep. of Germany . |
| 3226732 | 2/1983 | Fed. Rep. of Germany . |
| 3302725 | 8/1983 | Fed. Rep. of Germany . |
| 3340338 | 5/1984 | Fed. Rep. of Germany . |
| 3104455 | 2/1985 | Fed. Rep. of Germany . |

*Primary Examiner*—Jin F. Ng
*Assistant Examiner*—Stephen Brinich
*Attorney, Agent, or Firm*—Antonelli, Terry & Wands

[57] ABSTRACT

In the interline type charge transfer imaging device, two of the three groups of wiring through which driving pulses are sent to each of three groups of electrodes constituting vertical charge transfer devices are arranged in horizontal direction and the remaining one group of wiring is arranged in vertical direction. Light-shielding layer is installed on the vertically running wires and the electrodes connected with those wires.

14 Claims, 14 Drawing Sheets

LINE 2N-2
LINE 2N-1
LINE 2N

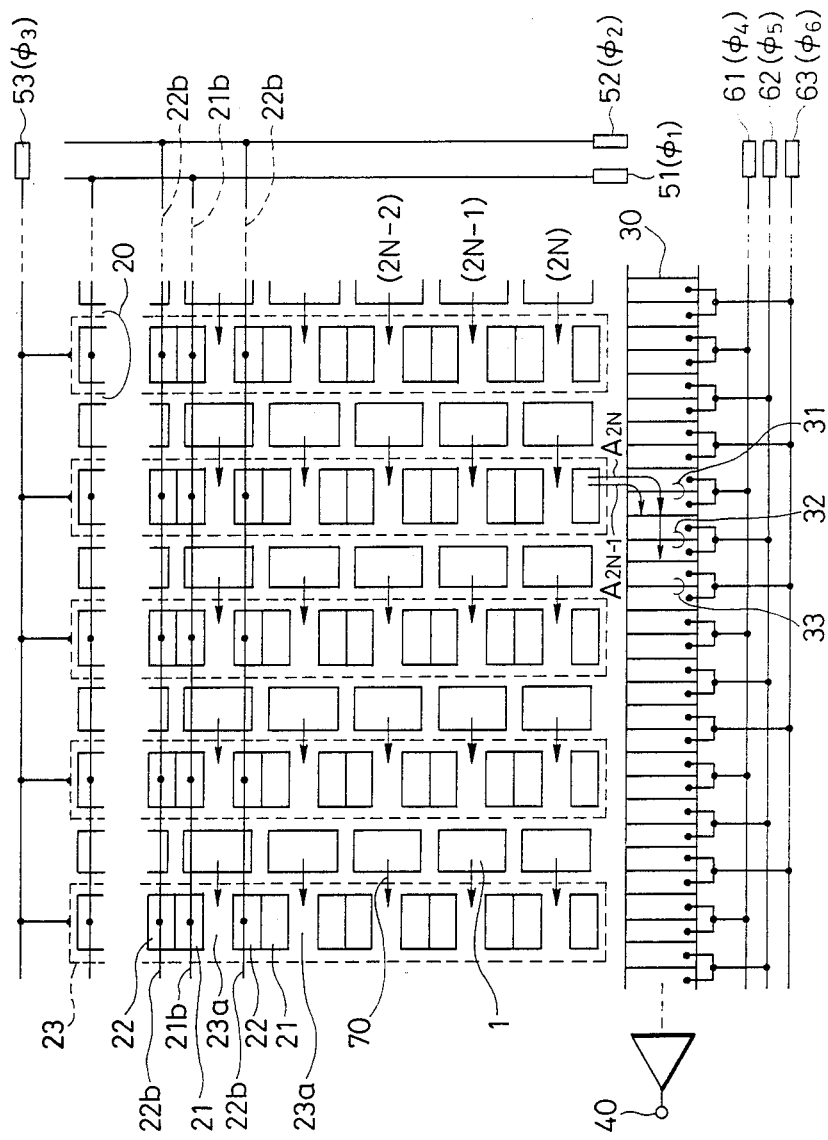

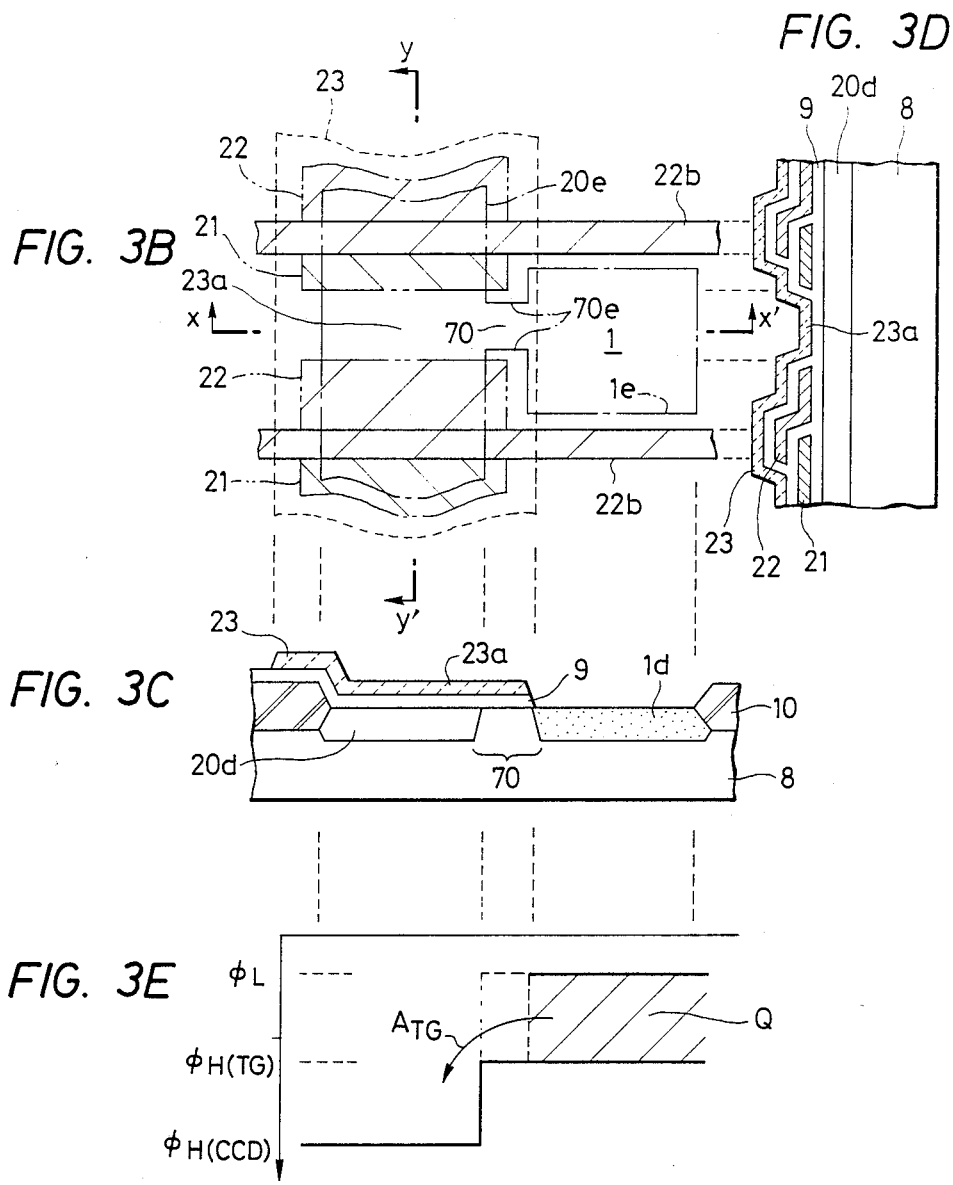

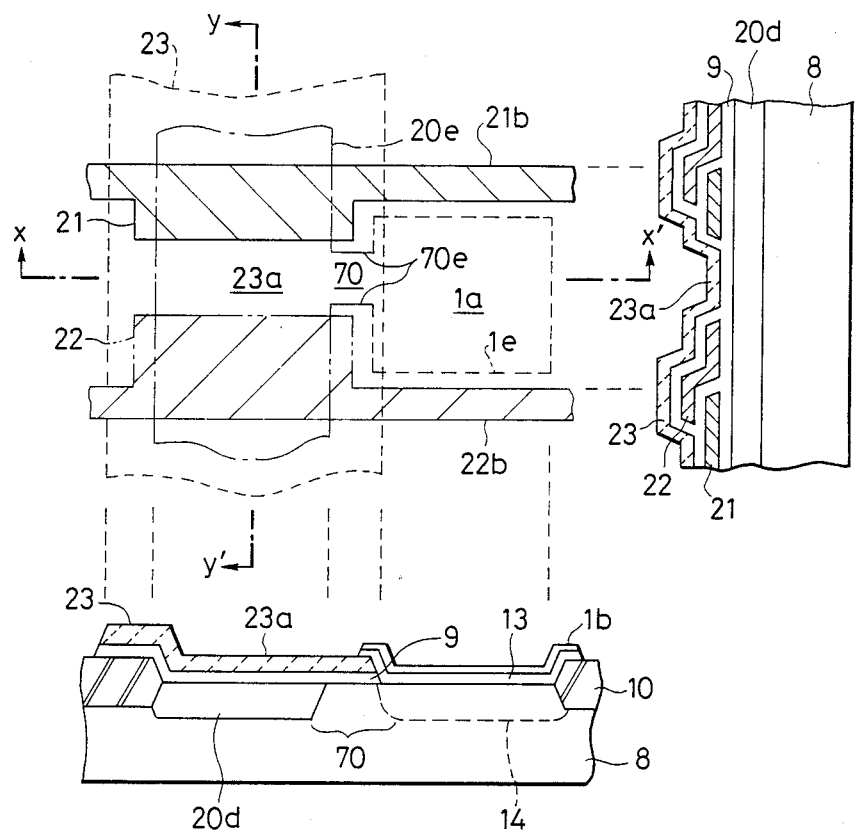

INTERLINE TYPE CHARGE TRANSFER IMAGING DEVICE

BACKGROUND OF THE INVENTION

The present invention relates to a solid-state imaging device wherein photoelectric conversion elements and charge transfer devices for extracting signal charges from the respective elements are integrated on a semiconductor substrate.

Solid-state imaging devices that use charge coupled devices (hereinafter abbreviated CCDs) as the charge transfer devices have been developed.

CCD imaging devices have high effective sensitivity because of their low noise characteristics and hold promise as a major solid-state imaging device in the future. The CCD imaging device is roughly classified into frame-transfer and interline types. The frame-transfer type has three essential drawbacks: (i) it requires not only an image area but also a storage area and therefore involves large chip size and low yield, (ii) a large number of pixels must be arranged in the horizontal direction to obtain the specified resolution, and (iii) low sensitivity. Accordingly, R&D efforts have in recent years been directed to the interline type that does not possess any of these drawbacks. A description of the interline type CCD imaging device is given in the Preprint of the 1980 Symposium of the Inst. of Television Engineers of Japan, pp. 33-34.

FIGS. 1A and 1B show the basic construction of an interline type CCD imaging device In FIG. 1A, the reference numeral 1 designates a photoelectric conversion element which consists of a photodiode, for example. Numerals 2 and 3 denote vertical and horizontal CCD shift registers which serve to carry optical signals from the photoelectric conversion elements to output terminal 4. Sets of devices 5-1 through 5-4 and 6-1 to 6-2 are clock pulse generators for the vertical and horizontal shift registers, respectively. Although in this example a four-phase and a two-phase clock pulse generator are used for vertical and horizontal shift registers, respectively, either four-phase or two-phase clock formats may be generally adopted. Numeral 7 represents a transfer gate that transfers the charge stored in the photodiode to vertical shift register 2. This device, which is a black-and-white imaging device, can be also used for color imaging by layering a color filter on it to provide each photodiode with color information. FIG. 1B shows a cross section of a pixel. Photodiode 1 is made of an n-type impurity semiconductor, for example. The symbol 2-1 denotes one of the electrodes constituting the vertical CCD shift register; symbol 2$d$ indicates an impurity layer (for example, n-type) to form the vertical CCD shift register channel into the buried type (this layer is not required for a surface type channel); numeral 8 represents a p-type substrate, for example, numeral 9 designates a gate oxide film (e.g. a thin SiO$_2$ film) that insulates the electrode from the substrate, and 10 indicates a field oxide film (e.g. a thick SiO$_2$ film) for pixel isolation.

As stated above, the interline type is advantageous over the frame-transfer type in that it is suitable for mass production because of its small chip size, requires only a small number of horizontal pixels (about one-third the number of horizontal pixels required for the frame-transfer type), and has high sensitivity. However, even the interline type is inferior in performance to image pickup tubes used for the current television broadcasting, and poses the following difficult problems to be solved.

(1) Interlaced scanning is carried out in the vertical direction. In this imaging device, by way of example, the pixel signals in odd-numbered rows (1, 3, 5, ..., 2N−1) are read out in the first field and those in the even-numbered rows (2, 4, 6, ..., 2N) are read out in the second field. As a result, in the first field of the next frame, the signals for the rows not read out in the preceding field (that is, odd-numbered rows) are read out in addition to the new signals (this phenomenon is usually called "image lag"). The solid-state imaging device which has a high switching speed features no image lag. In actuality, however, it involves image lag attributable to the interlaced read-out system as described above. The rate of this image lag is as high as 50% and greater than that for electron tubes. This is the rate offensive to the human eye.

(2) In the vertical direction, filters of the same color are provided over two rows of pixels. Therefore, in the vertical direction, in spite of employing interlaced scanning and checkerboard color filters (which has filters colored green, the primary component of the luminance signal, double as many as red or blue filters), the device can offer only a resolution corresponding to half of the number of pixels, resulting in degraded picture quality. This limitation, along with the image lag described in (1), hinders the solid-state imaging device from being put to practical use.

(3) When a complementary color filter with high transmittance is used to improve the sensitivity, moire due to color signal operation is generated to degrade the picture quality. (When a primary color filter consisting of red, blue, and green filters with low transmittance is used, however, the amount of moire generated is small.)

It was found that to solve the above problems it is necessary to read out signals from two vertically adjacent rows of photodiodes simultaneously and to transfer the signals through different vertical CCD shift registers. In this description, "to read out signals from two rows of photodiodes simultaneously" means to output both signals for two adjacent scanning lines from the imaging device within the same horizontal scanning period. One of the inventors, with assistance from his co-workers, proposed an interline type CCD imaging device as shown in FIG. 2. (Refer to Japanese utility model registration application No. 56-149492: laid open No. 58-56458. Corresponding foreign applications are U.S. Ser. No. 423,466; European patent application No. 82109194.9, Publication No. 0077003: Canadian patent application No. 413037: Korean patent application No. 82-4547.) In FIG. 2, symbols 2-1 and 2-2 designate a pair of opposing vertical CCD shift registers, and numeral 11 is an insulator that electrically separates the CCD shift registers from each other. Signals from two vertically adjacent rows, for example, the rows represented by photodiodes (1-1, 1-2), and (1-3, 1-4), are transferred toward different vertical CCD shift registers toward the horizontal CCD. The signals delivered from vertical CCD shift registers 2-1 and 2-2 are further transferred to output terminals 4-1 and 4-2 through horizontal CCD shift registers 3-1 and 3-2, respectively.

It was found from actual evaluation that the above-mentioned problems can be solved by employing this 2-column vertical CCD system. However, this system has given rise to new problems such as reduced photodiode area (reduction in the amount of data (signals)

stored and narrowed dynamic range), and reduction in area exposed to light (aperture) and restricted sensitivity despite the use of a complementary color filter. In efforts to solve these problems, we arrived at the concept of "reading out two lines simultaneously using one column of vertical CCD shift registers". One way to embody this concept is to use three-phase drive vertical CCD shift registers, store signal in one of the three electrodes, and transfer the signal successively. The frame-transfer type has prospects of three-phase drive because it has a relatively large space of imaging area. On the contrary, for the interline type, it is difficult to implement a three-phase drive system for the following reasons: (i) Both vertical CCDs and photodiodes occupy the same area, leaving little space in reserve; (ii) Unlike in the case of conventional four- or two-phase drive (even number of phases), all clock wires cannot be regularly arranged in the vertical direction. In the case of three-phase drive, the wire for one of the three phases is inevitably laid in an irregular fashion (for example, routed every one row or through the centers of the photodiodes), resulting in light sensitivity irregularities and flickers. Moreover, the wiring for this phase is inevitably ununiform because of the level difference between the wire and the wires for the remaining two phases, causing light sensitivity irregularities; (iii) A slight three-phase electrode mask misalignment in the fabrication process also results in sensitivity irregularities. As a result, the implementation of simultaneous two-line read-out system using a three-phase drive interline type requires well-designed device composition and construction.

SUMMARY OF THE INVENTION

An object of the present invention is to provide an interline type charge transfer imaging device in which the vertical charge transfer devices are driven in three phases without producing sensitivity irregularities as described above.

In order to accomplish the object, according to the present invention, each of the vertical charge transfer devices consists of a plurality of three-electrode sets, each electrode being driven in three phases; the wires for supplying drive pulse to two of the three electrodes run in the horizontal direction; and the wire for supplying drive pulse to the remaining electrode runs in the vertical direction.

BRIEF DESCRIPTION OF THE DRAWINGS

In the accompanying drawings:

FIG. 3A is a diagram showing the construction of an embodiment of the present invention.

FIG. 3B is a diagramatic plan view of a pixel of the imaging device shown in FIG. 3A.

FIG. 3C is a section taken on line x-x' in FIG. 3B.

FIG. 3D is a section taken on line y-y' in FIG. 3B.

FIG. 3E is a diagram showing transfer gate potentials of the imaging device.

FIG. 6A is a plan view of a pixel of a still further alternative embodiment of the invention.

FIG. 6B is a section taken on line y-y' in FIG. 6A.

FIG. 6C is a section taken on line x-x' in FIG. 6A.

DETAILED DESCRIPTION OF PREFERRED EMBODIMENTS

Figure 3F:
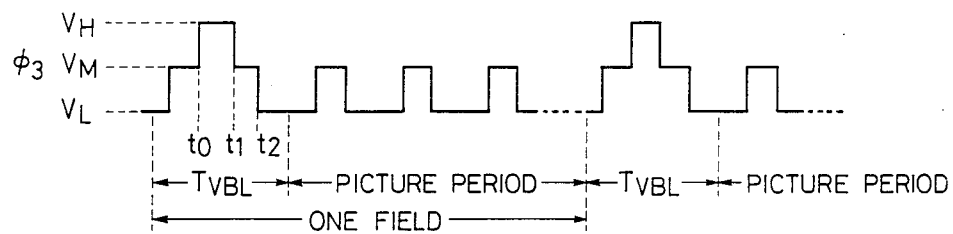
FIG. 3F is a diagram showing the waveform of pulse which drives the transfer gates and vertical CCDs of the imaging device.

Referring now to the drawings, wherein the numerals in the different views identify identical parts, FIGS. 3A to 3H show the construction, operation, and drive waveforms of an interline type CCD imaging device constructed in accordance with the present invention. In FIG. 3A, numeral 1 indicates a photodiode region, numeral 20 designates a vertical CCD shift register, and numeral 21 denotes an electrode made of polycrystalline silicon used for the first layer, for example, to which the first phase clock pulse $\phi_1$, for example, is applied. Numeral 22 indicates an electrode made of polycrystalline silicon used for the second layer, for example, to which the second phase clock pulse $\phi_2$, for example, is applied. Numeral 23a designates an electrode made of polycrystalline silicon used for the third layer to which the third phase clock pulse $\phi_3$, for example, is applied. Here, the wires 21b and 22b for the first and second layer electrodes 21 and 22 run in the horizontal direction, while the wire for the third layer electrode 23a, that is, the third layer 23 itself, runs in the vertical direction, passing across electrodes 21 and 22. (Wire 21b is arranged beneath wire 22b and therefore does not appear in FIG. 3B.)

FIG. 3B is a diagramatic plan view of the construction of one of the pixels constituting the device shown in FIG. 3A. Electrode 23 is arranged so as to cover electrodes 21 and 22, and doubles as gate 70. Symbols 1e, 20e, and 70e designate the contours of photodiode 1, buried type channel forming impurity layer 20d, and transfer gate 70, respectively. FIG. 3C is a cross-sectional view taken along line x-x' in FIG. 3B. The reference numeral 1d indicates a photodiode impurity layer, numeral 20d denotes an impurity layer to form the channel of vertical CCD 20 into a buried type, and numeral 23 represents the third layer electrode which constitutes vertical CCD shift register electrode 23a and, at the same time, doubles as transfer gate 70. FIG. 3D is a section taken on line y-y' in FIG. 3B. Numerals 21, 22, and 23 designate the first, second and third layer electrodes which constitute the vertical CCD shift register. The third layer electrode 23 runs in the vertical direction. FIG. 3E shows the potential distribution during read-out of signal charge Q from the photodiode. FIG. 3F shows the waveform of vertical clock pulse applied to the vertical CCD shift register. Here, one of three-phase pulses, clock pulse $\phi_3$ with high-voltage pulse ($V_H$ level) for read-out is shown as an example. (The other two phases $\phi_1$, and $\phi_2$ can have either of two levels $V_L$ and $V_M$. Phases $\phi_1$, $\phi_2$, and $\phi_3$ are 120° out of phase with each other.)

With reference now to the drawing and more particularly to FIGS. 3E and 3F, there will be described the operation of the imaging device of the present invention.

Figure 7A:
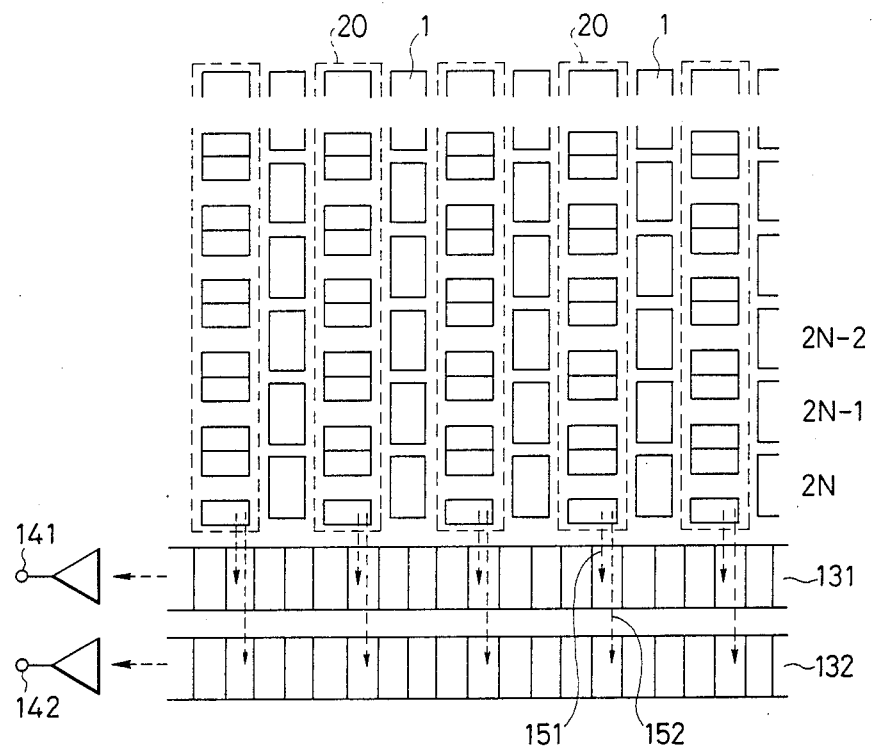
FIGS. 7A and 7B are diagrams of a still further alternative embodiment of the invention, FIG. 7A showing the overall construction of the imaging device and FIG. 7B showing a horizontal CCD of the imaging device.

Signal charge Q is stored in photodiode 1 by the light entered during the field period after the previous signal read-out. By pulse $\phi_3$ raised to level $V_H$ at time $t_0$ within vertical blanking period $T_{VBL}$, the transfer gate potential is lowered from $0_L$ to $\phi H(TG)$. The potential of vertical CCD electrode 23a is also reduced to level $\phi H(CCD)$ by the application of $V_H$ level voltage. As a result, charge Q stored in the photodiode is transferred to the vertical CCD through the transfer gate at level $\phi H(TG)$, as indicated by arrow ATG. When all charges are transfered, that is, read-out operation is completed, the potential of the photodiode is reset to the potential $\phi H(TG)$ of the transfer gate. Subsequently, the photodiode starts to store the signal charge for the next frame. The voltage of pulse drops down to $V_M$ at time $t_1$ but signal charge Q is temporarily stored beneath electrode 23a until $t_2$. At $t_2$, the voltage of drops to $V_L$ and signal charge Q under the electrode 23a moves beneath electrode 22 to which clock pulse $\phi_3$ of level $V_M$ is applied. At $t_2$ or some time after $t_2$, the vertical blanking period ends and the picture period begins. With the start of the picture period, clock pulses $\phi_1$, $\phi_2$, and $\phi_3$, which alternate between levels $V_L$ and $V_M$, are applied to electrodes 21, 22, and 23a, and charge Q under electrode 22 is transferred toward the horizontal CCD shift register through electrodes 21, 23a, 22, and 21 in order. During this charge transfer, that is, during picture period, the transfer gate is kept in a nonconducting state and no charge is sent from the photodiode since $V_H$ level is never applied to the transfer gate. Thus, the charge in the vertical CCD shift register is sent to the vertical CCD shift register in amounts corresponding to one electrode, that is, one row at a time. Since charges for two rows must be read out from the photodiodes, it is necessary to send signal charges for two rows, $Q_{2N}$ and $Q_{2N-1}$, to the horizontal CCD and transfer these charges through the CCD at the same time. In the present embodiment, in order to accomplish this purpose by one horizontal CCD, the horizontal CCD 30 is made to perform double transfer operation by means of three-phase clock pulse. A description of the double transfer operation will be given below. Transfer of charges for two rows can be also achieved by using two or more horizontal CCDs. This method will be also described later with reference to FIGS. 7A and 7B.

Figure 3G:
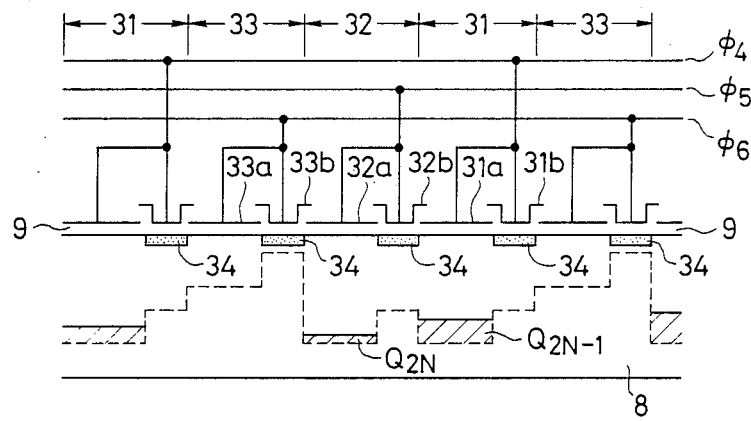
FIG. 3G is a diagram showing the construction of a horizontal CCD of the imaging device and the potential well of the horizontal CCD.
Figure 3H:
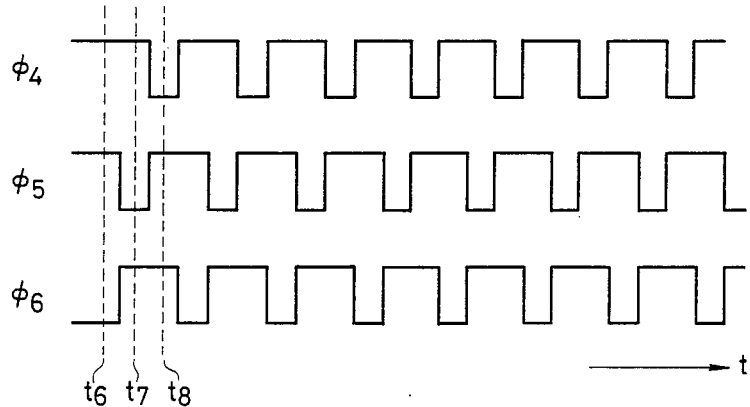
FIG. 3H is a waveform of pulse which drives the horizontal CCD.

The transfer of charge from the vertical CCD to the horizontal CCD is performed during the horizontal blanking period provided for each horizontal scanning period (normally 64 μsec). At time $t_4$ within a horizontal blanking period, signal charge $Q_{2N}$ in the photodiode of the 2N-th row is transferred to horizontal CCD electrode 31. At time $t_5$, signal charge $Q_{2N}$ advances one stage within the horizon CCD and moves beneath electrode 32 as indicated by arrow $A_{2N}$ in FIG. 3A. Next, at time $t_6$, signal charge $Q_{2N-1}$ in the photodiode of the (2N-1)-th row is sent beneath electrode 31 as indicated by arrow $A_{2N-1}$. In other words, signals for two rows, 2N and 2N-1, are sent beneath two adjacent electrodes within the horizontal CCD. FIG. 3G is a cross-sectional view showing a horizontal CCD 30 and its internal potential well and indicates that two signal charges $Q_{2N}$ and $Q_{2N-1}$ are stored beneath two adjacent electrodes 32 and 31, respectively. Horizontal CCD 30 is constructed of the first layer electrodes 31a, 32a, 33a, etc and the second layer electrodes 31b, 32b, 33b, etc., both of which are provided on gate oxide film 9 (for example, thin $SiO_2$ layer) on the surface of semiconductor substrate 8. Impurity layer 34, which is of conductivity type like that of substrate 8, is provided to raise the surface potential beneath the second layer electrodes, that is, to form a barrier. This impurity layer can be formed by ion-implanting atoms to form the same conductive parts as for the substrate, on the surface of the substrate not covered by the first layer electrodes, whereby the first layer electrodes are used as masks. Electrodes 31, 32, 33, which constitute storage areas, consist of pairs of electrodes of the first and second layers (31a, 31b), (32a, 32b), and (33a, 33b), respectively. For charge transfer, clock pulses $\phi_4$, $\phi_5$, and $\phi_6$ are applied to electrodes 31, 32, and 33. These clock pulses are 120° out of phase with each other as indicated in FIG. 3H.

FIG. 3G shows the potential state at time $t_6$ when $\phi_4$ and $\phi_5$ are at high level and $\phi_6$ is at low level. When the horizontal blanking period ends and the picture signal period begins, the potential well varies with varying clock pulse to perform charge transfer. First, at time $t_7$, signal charge $Q_{2N}$ is transferred from electrode 32 to electrode 33. At time $t_8$, signal $Q_{2N-1}$ is fed from electrode 31 to empty electrode 32. By repeating this operation, signals $Q_{2N}$ and $Q_{2N-1}$ for two rows can be fed to output terminal 40. The horizontal CCD charge transfer operation as stated above, that is, transfer of two signals using a single CCD (signal, signal, empty, signal, signal, empty, . . . ) is referred to as a double transfer operation. In the subsequent field, the signal stored in the photodiode is transferred to the horizontal CCD in the same manner as described above. To transfer a signal from the vertical CCD to the horizontal CCD during a horizontal blanking period, signals for two rows (that is, a pair of 2N-1 and 2N-2 row signals) shifted one row relative to the previous field stated above are sent to the horizontal CCD in this field, and in the picture signal period, these signals are transported by double transfer operation so that sets of signals for two rows which are shifted one-row can be obtained at output terminal 40. Thus, simultaneous two-row readout consistent with interlaced scanning are implemented. There are various methods of transferring signals to the horizontal CCD with one row shift relative to the previous field. Two simple methods will be described below.

(1) Signals of the photodiodes in the last row (nearest to the horizontal CCD) are first sent to the horizontal CCD and, during the vertical blanking period, transferred to output terminal 40. That is, the signals in the photodiode of the last row are not used. As a result, in the vertical CCD, signals which are shifted one row relative to the previous field line up in order.

(2) In contrast with the method described in (1), signals of the photodiode in the first row (farthest from the horizontal CCD) are transferred toward a reverse direction by driving reversely the vertical CCD and, during the vertical blanking period, transferred to the diffusion layer (drain) enclosing a photoelectric conversion region. As a result, the signals in the vertical CCD are shifted one row relative to the previous field. Then, the signals are transferred from the vertical CCD to the horizontal CCD as described above.

The design and operation of the embodiment in FIG. 3A have been described. In addition to the above, the following design and operation can be considered.

(1) When signal charge is read out from the photodiode to the vertical CCD, the charge is stored only in electrode 23a in the operation described above. The charge can be also stored under two electrodes (23a and 21, or 23a and 22) by applying $V_H$ or $V_M$ level voltage to electrode 21 or 22. Storage of charge in two electrodes increases the storage capacity and reduces the potential rise due to charge sent to the vertical CCD. As a result, the increase in potential under the transfer gate (called feedback effect) is reduced and less charge is left unread (image lag is reduced). The feedback image lag is very small in degree as compared with the image lag based on interlacing (described in Background of the Invention) which is a problem with existing devices. However, after the interlace image lag is eliminated and the sensitivity is improved by the present invention, the feedback image lag may be visually perceptible and therefore it is desirable that the feedback image lag be also eliminated.

Figure 4A:
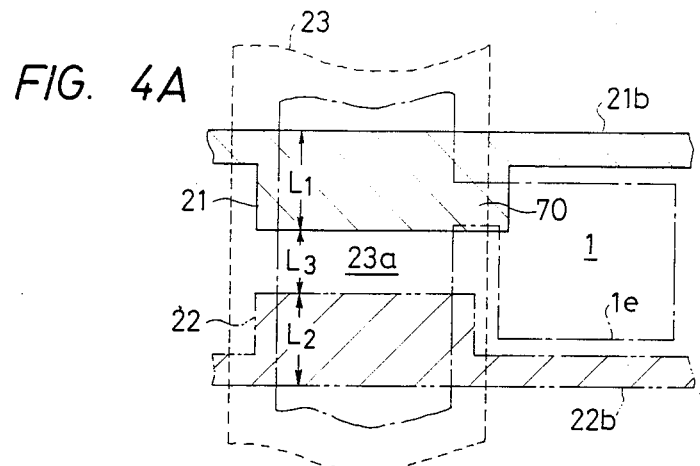
FIGS. 4A, 4B, and 4C are diagramatic plan views of a pixel of embodiments of the invention which are different from the one shown in FIG. 3A and also different from each other.
Figure 4B:
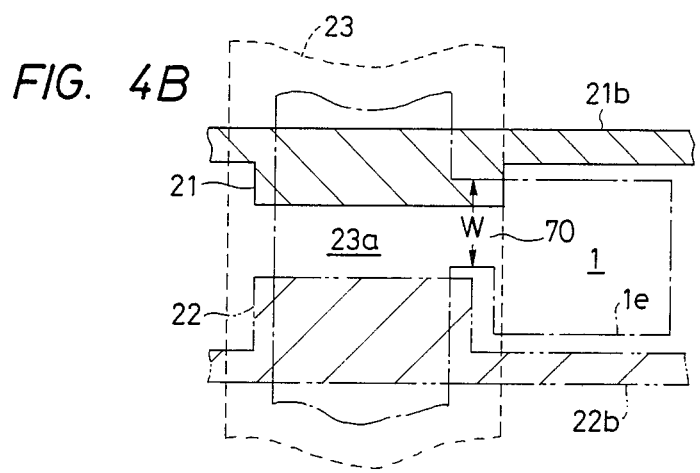
Figure 4C:
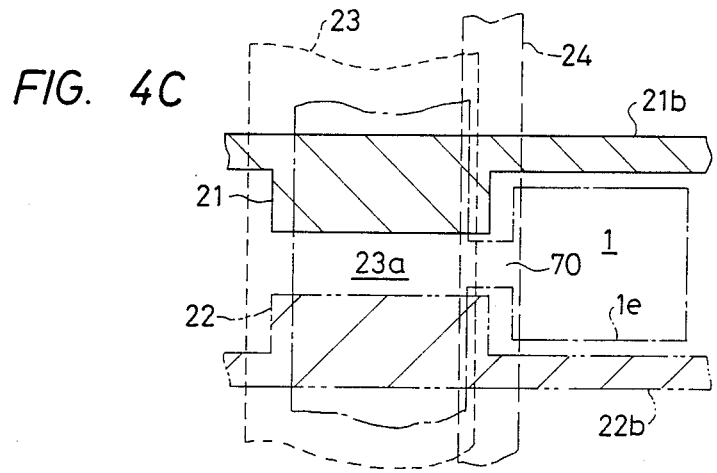

(2) In the embodiment described above, transfer gate 70 is constructed of the third layer electrode. It may be constructed of the first layer electrode as shown in FIG. 4A or of both the first and third layer electrodes as shown in FIG. 4B. Moreover, as shown in FIG. 4C, it may be separated from the three electrodes constituting the vertical CCD and constructed of a fourth layer electrode 24, for example. In FIG. 4B, the channel width W that determines the conductance of transfer gate 70 is greater that of the embodiment shown in FIG. 4A so that the time required for reading out the signal charge from the photodiode to the vertical CCD can be reduced, and in the vertical CCD, the read-out charge is stored beneath two electrodes to increase the storage capacity so that the amount of charge unread due to the feedback effect described above can be reduced. The transfer gate may be constructed of the second and third layer electrodes. (For this embodiment, figures are omitted because of the similarity to the embodiment shown in FIG. 4B.)

(3) In the embodiment described above, the device is so designed that the areas of vertical CCD electrodes 21, 22, and 23a are equal. To simplify layout design, the design may be such that the three electrodes have different areas. For example, the channel lengths $L_1$, $L_2$, and $L_3$ in the direction of transfer are made different (e.g. $L_1 \neq L_2 \neq L_3$ or $L_1 = L_2 \neq L_3$) as shown in FIG. 4A.

The basic design of the CCD imaging device of the present invention has been described. Another essential part of the present invention is the construction of the CCD electrodes; particularly, the construction and material of the third layer electrode is essential for the implementation of interline type devices. FIGS. 5A to 5H show the construction focusing on the third layer electrode.

Figure 5A:
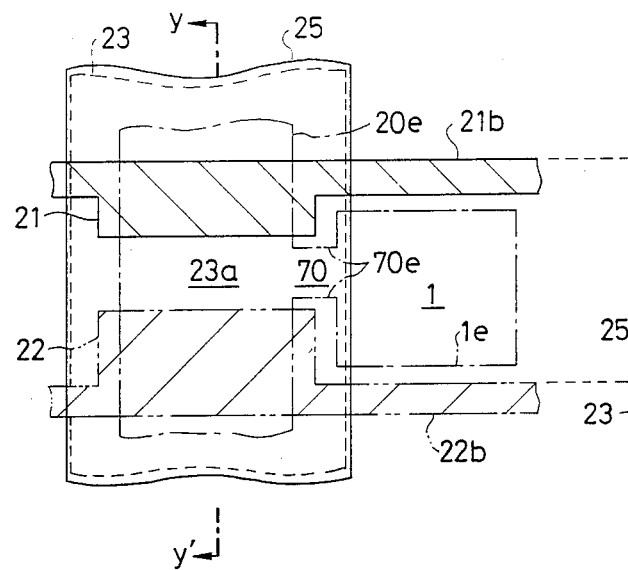
FIG. 5A is a plan view of a pixel of an alternative embodiment of the invention.
Figure 5B:
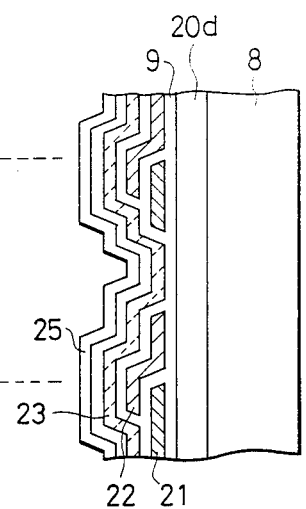
FIG. 5B is a section taken on line y-y' in FIG. 5A.
Figure 5C:
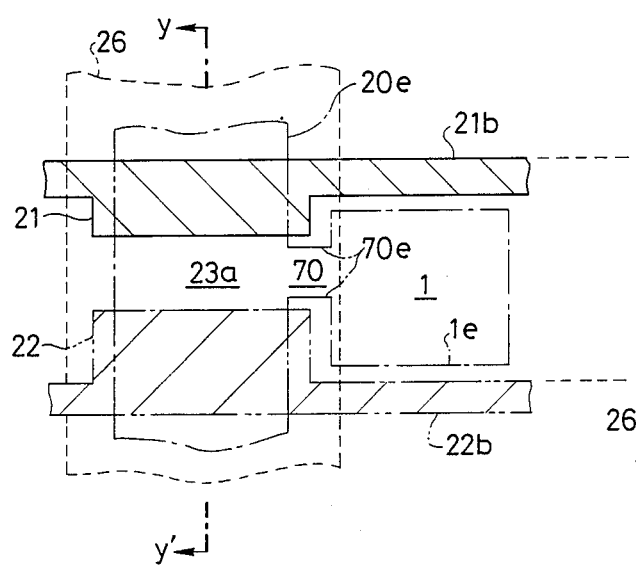
FIG. 5C is a plan view of a pixel of a further alternative embodiment of the invention.
Figure 5D:
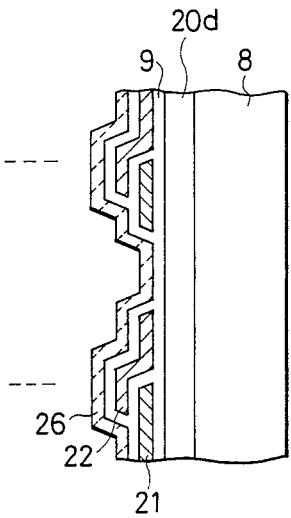
FIG. 5D is a section taken on line y-y' in FIG. 5C.
Figure 5E:
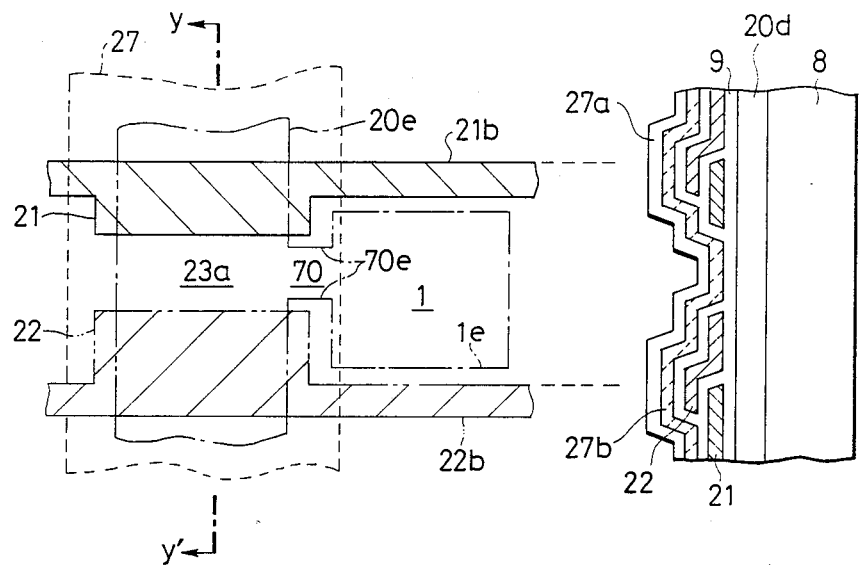
FIG. 5E is a plan view of a pixel of a still further alternative embodiment of the invention.
Figure 5F:
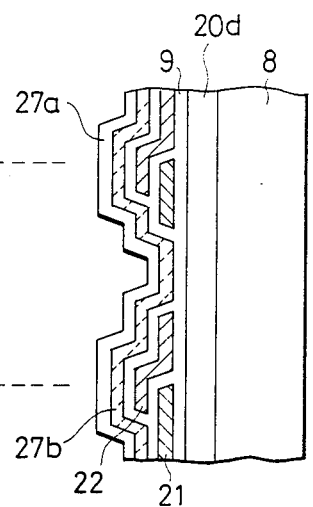
FIG. 5F is a section taken on line y-y' in FIG. 5E.
Figure 5G:
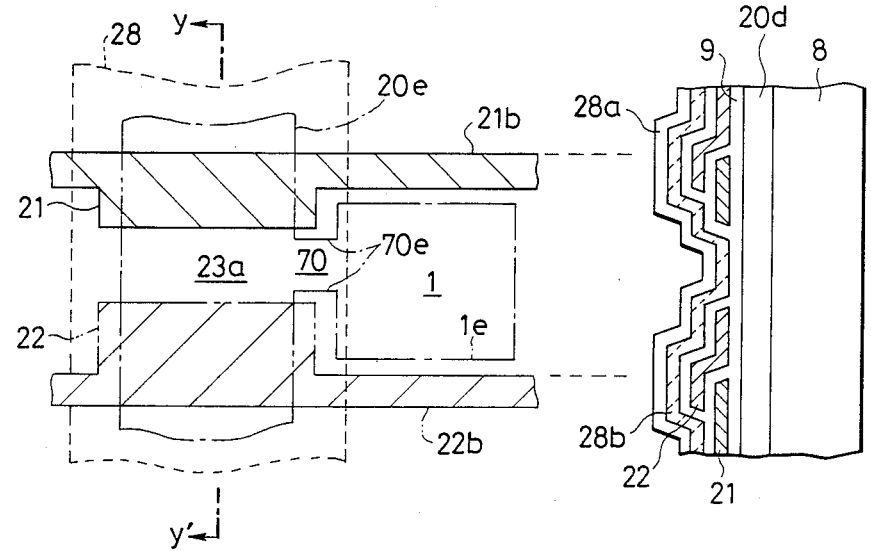
FIG. 5G is a plan view of a pixel of a still further alternative embodiment of the invention.
Figure 5H:
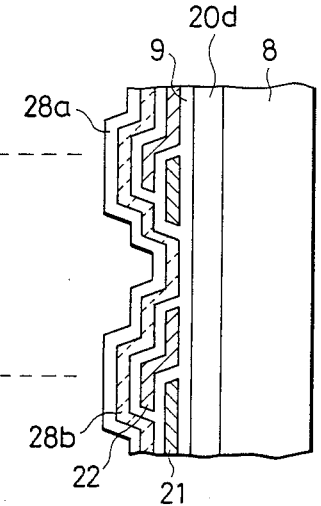
FIG. 5H is a section taken on line y-y' in FIG. 5H.

The transfer section of the vertical CCD in particular must be protected from light by forming a light shielding film on it because the polycrystalline Si which is used as a gate electrode of the interline type device is transparent. On the other hand, this light shielding film reduces the aperture of the photodiode. The film must therefore be formed by giving consideration to the two factors referred to above. As shown in FIGS. 5A and 5B (corresponding to FIGS. 3B and 3D), light shielding film 25 made of metal (such as Al) should be formed on electrode 23 of the third layer. Some problems are encountered in the production of the film because (1) high accuracy is required in aligning the film with electrode 23 of the polycrystalline Si gate, (2) the difference between stage levels in the substrate is too great for the light shielding film to be accurately formed, (3) the number of processes is too many, and there are other problems. The embodiments of the present invention, wherein these problems are solved, are shown in FIGS. 5C and 5D, 5E and 5F, and 5G and 5H. FIGS. 5C and 5D show the case where electrode 26 of metal having a light shielding effect (such as Al, W, and Mo) is used as the third-layer electrode. In other embodiments, an electrode made of a double structure consisting of silicide electrode 27a (such as Si and Mo alloy and Si and W alloy) having an excellent light shielding effect and polycrystalline Si layer 27b is used as third-layer electrode 27 as illustrated in FIGS. 5E and 5F. FIGS. 5G and 5H indicate electrode 28 of the third layer for which the double-structure electrode made of metal layer (of such elements as Al, W, and Mo) 28a with a high light shielding effect and polycrystalline Si layer 28b is used. In the embodiments mentioned above, the foregoing problems (1) through (3) are solved because the third-layer gate electrode offers light shielding effect.

FIGS. 6A and 6C show the embodiment in which the photodiode not of the junction type but of the MIS (Metal-Insulator-Semiconductor) type is employed. As is shown in FIG. 6A, electrodes 21, 22, and 23 constituting the vertical CCD and the transfer gate can be arranged in the same manner as with the case shown in the foregoing FIGS. 3B through 3D or FIG. 4A, 4B, or 4C. In the present embodiment, transfer gate 70 is thrown into conduction when the high-level voltage $V_H$ is applied to electrode 23. As a result, the signal charge 9 stored in the MIS type photodiode 1a (1e indicates the delineation) is supplied under electrode 23a via the transfer gate. FIG. 6C shows the cross section of x-x' indicated in FIG. 6A. In area 1a of the photodiode, transparent electrode 1b (of such elements as $SnO_2$ or $InO_2$ or of polycrystalline Si film less than several nm thick) is mounted on thin oxide film 13 (the thickness of which is comparable to or several times as great as that of gate oxide film 9). Depletion region 14 is created on the surface of substrate 8 of the semiconductor when the specified voltage is applied to transparent electrode 1b, whereupon the charge (for example, electron) generated by incident light is stored in this depletion region. In the present embodiment, electrode 1b for the photodiode is installed only in the diode region for simplicity's sake. The entire surface of the device may be covered with the electrode. (If the electrode is installed over the entire region, however, the depletion region which causes photoelectric conversion under the application of the specified voltage will be formed only in region 13 where the oxide film is small in thickness. No depletion region will be created in region 10 which is covered with the thick oxide film.)

Figure 2:
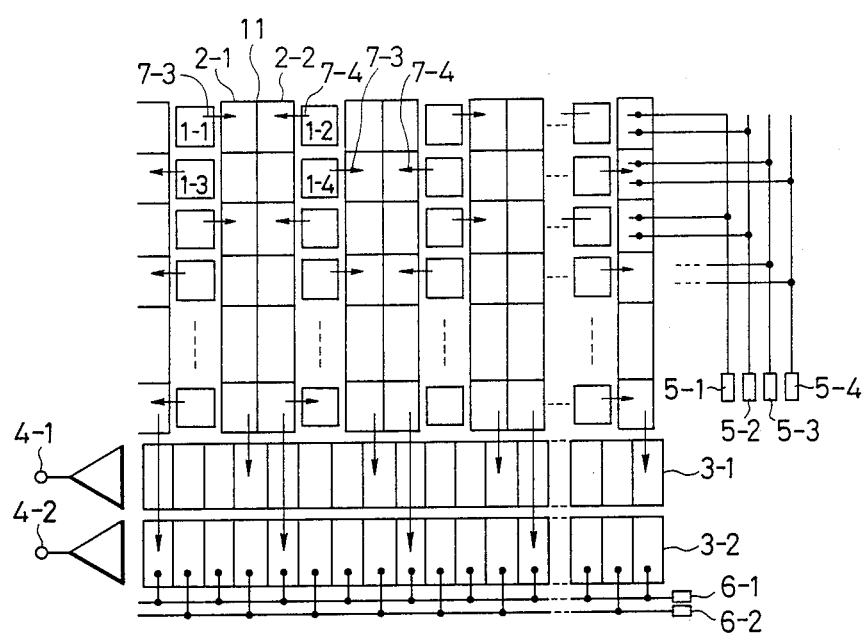
FIG. 2 is a diagram showing the construction of an improved CCD imaging device.
Figure 7B:
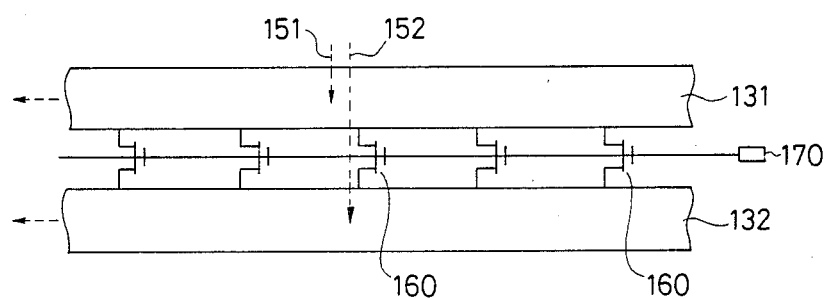

In the embodiments explained above, the signal charge from simultaneously read out two rows of photodiodes is transferred to the output port by a simplex horizontal CCD shift register. Here, two or more (two in this case) horizontal CCDs may be used as is the case with the imaging device shown in FIG. 2. The reference numerals 131 and 132 indicate horizontal shift registers in FIG. 7A. The signals from photodiodes located in even-numbered rows are sent into shift register 132 (indicated by the arrow 152) and those from photodiodes in odd-numbered rows into shift register 131 (indicated by the arrow 151). On the other hand, the two-row signals are obtained from output terminals 141 and 142. FIG. 7B shows the way in which signal charges are sent into two horizontal CCD shift registers. Here, the reference numeral 160 indicates the switch gate which separates register 131 from register 132 and sends the signal into register 132 and the reference numeral 170 denotes the gate pulse generator which opens and closes the switch gate By way of example, the signal from the photodiode in the even-numbered row is sent into shift register 132 from shift register 131 via switch 160 which is placed under a high voltage applied (thrown into conduction) by generator 170. Subsequently, the signal from the photodiode in the odd-numbered row is supplied to shift register 131. This signal is not introduced into shift register 132 because the switch is placed under low voltage or in the non-conduction state. Sending those signals into shift registers 132 and 131 is accomplished in the horizontal blanking period as is the case with the embodiment shown in FIG. 3A.

Figure 8:
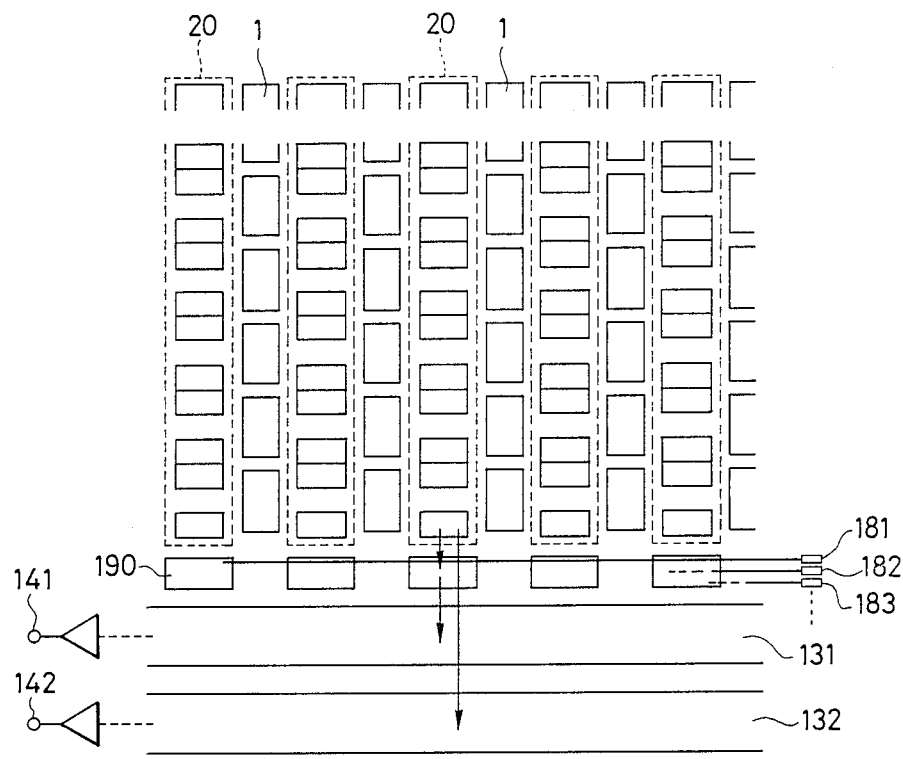
FIG. 8 is a diagram of a still further alternative embodiment of the invention.

FIG. 8 indicates the embodiment in which temporary signal storage 190 is installed between vertical CCD shift register 20 and horizontal CCD 131. This memory consists of the first- to third-layer electrodes as in the case of the CCD electrodes. (As a matter of course, the memory may consist of only the first- or third-layer electrode or combined first- and second-layer electrodes.) Pulses generated in generators 181, 182, 183,—are applied to each electrode. Due to this pulse operation, the signals from photodiodes located in even-numbered rows are sent into shift register 132 and those from photodiodes in odd-numbered rows are temporarily stored in memory 190 in the horizontal blanking period $t_{11}$. The signals from the photodiode located in the $(2n-1)$-th row is sent from memory 190 into shift register 131 in the period $t_{12}$. Through incorporation of the memory for storing the signals from one or two rows of photodiodes, sending the signal into the horizontal CCD shift register is timed as desired. (To put it in another way, the timing restriction imposed on vertical clock pulses $\phi_1$, $\phi_2$, and $\phi_3$ can be alleviated through installation of the memory.) The description has been given to the case where signals are sent into two horizontal CCD shift registers via the memory. The signals from two adjacent rows of photodiodes may be sent via the memory into the bit adjacent to one horizontal CCD shift register.

Figure 9A:
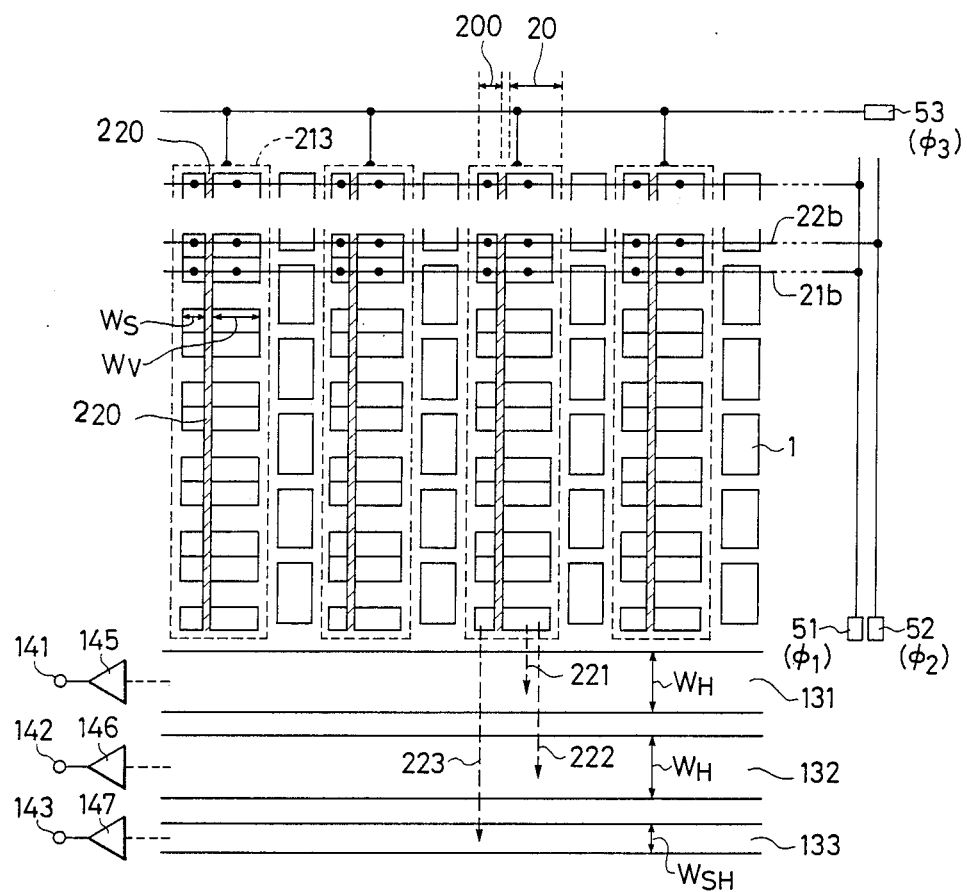
FIGS. 9A, 9B, and 9C are diagrams of a still further alternative embodiment of the invention, FIG. 9A showing the overall construction of the imaging device, FIG. 9B showing a pixel of the imaging device, and FIG. 9C showing a section taken on line x-x' in FIG. 9B.
Figures 9B, 9C:
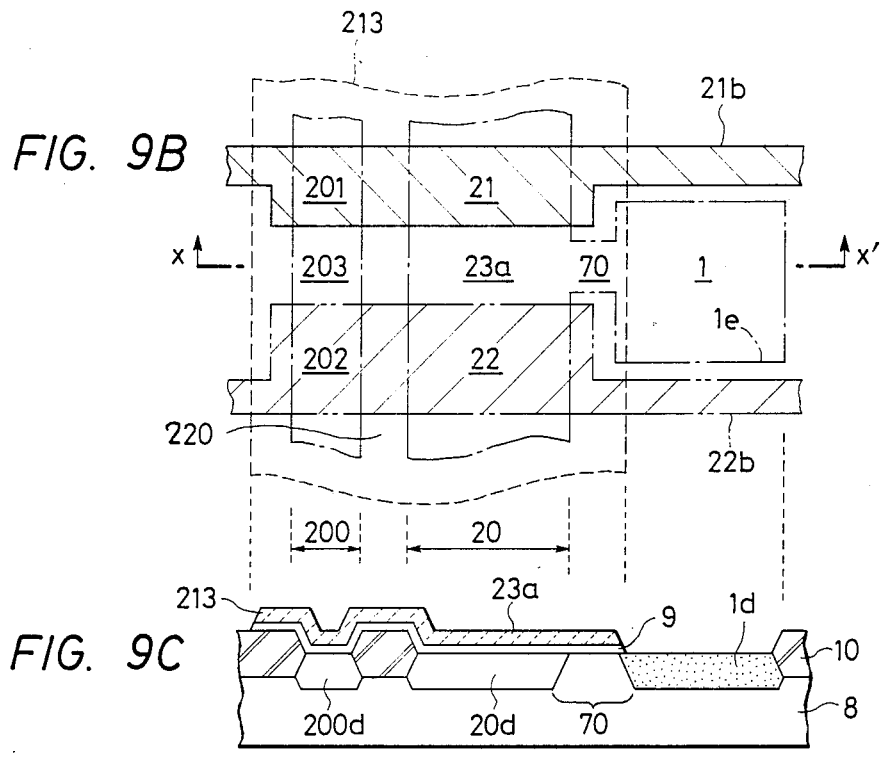

As has been described, the signals from two rows of photodiodes can be delivered by one vertical CCD shift resister in the interline type CCD imaging device. There is therefore sufficient space available in the device. The aperture can be increased when this space is used as a photodiode region. On the other hand, one more row of CCD shift register may be installed in this space to collect the smear charge. FIGS. 9A and 9C show the interline type CCD imaging device in which the CCD for collecting the smear charge is incorporated. In FIG. 9A, the reference numeral 200 represents the smear charge collecting CCD shift register which is located in parallel with vertical CCD shift register 20 with insulation zone 220 inserted between them; 213 indicates the third-layer electrode which covers smear charge collecting CCD 200, vertical CCD 20, and transfer gate 70; 201 denotes the first-layer electrode constituting CCD 200; 202 shows the second-layer electrode constituting CCD 200; clock pulses $\phi_1$, $\phi_2$, and $\phi_3$, for example, are applied between electrodes 201 and 21, 202 and 22, and 203 and 23a respectively. FIGS. 9B is a plan indicating the arrangement of individual pixels shown in FIG. 9A. FIG. 9C shows the cross section of x-x' indicated in FIG. 9B. Here, $200d$ denotes the buried channel layer constituting smear charge collecting CCD 200. The signals simultenously read out from two rows of photodiodes are sent into horizontal CCD shift registers 131 and 132 by one vertical CCD shift register 20 in the same manner as with the foregoing operation. The charge which is generated by the incident light is primarily changed into the signal charge because it is absorbed by the photodiode. This charge, called the smear charge, is partially diffused into other areas and appears in the form of white vertical stripes on the screen of the monitor TV. The smear charge is also admitted into vertical CCD shift register 20 and smear charge collecting CCD 200. The smear charge entering CCD 200 is sent into smear charge collecting horizontal CCD 133. Suppose that the amount of smear charge sent into vertical CCD 20 is qv and that of smear charge admitted into smear charge collecting CCD 200 is qs. Then, the charge to be delivered by vertical CCD shift register 20 will be Q+qv (Q is the signal charge) and that sent by smear charge collecting CCD 200 will be qs. The magnitude of qv and qs unconditionally depends on the geometrical arrangement of vertical CCD, smear charge collecting CCD, and photodiodes and the width of each CCD channel. The relationship between qv and qs also depends on the layout design of the device and is expressed by qv>qs, qv<qs, or qv=qs. When qv>qs (qv=αqs, α>1), only the signal component (Q) free of smear charge is obtained by calculating the difference between the level of signal derived from output terminals 141 and 142 and the smear output from terminal 143 after amplifying by α times the smear output from horizontal CCD 133. To obtain the signal component (Q) free of smear charge when qv<qs, the difference between the level of signal from terminals 141 and 142 and the smear output is calculated after attenuating the smear output from horizontal CCD 133 to 1/α of the original level. As far as amplification and attenuation is concerned, gains from MOS source follower circuits 145, 146, and 147 which are generally used as output circuits may vary among terminals 141, 142, and 143 or different from inputs to subtractors (for example, differential amplifiers) to be installed behind output terminals 141, 142, and 143. In the present embodiment, the channel width $W_S$ or $W_{SH}$ of the smear charge collecting CCD shift register is smaller than the channel width $W_V$ of vertical CCD 20 or the channel width $W_H$ of horizontal CCDs 131 and 132. If the channel width $W_S$ of smear charge collecting CCD is too large, the surface area (or aperture) of the photodiode will decrease because the amount of smear charge is 1/50 to 1/100 of that of the signal charge. (Naturally, the device may be designed so that $W_S = W_V$ or $W_S > W_V$ depending on the application of the device or performance.)

Figure 1A:
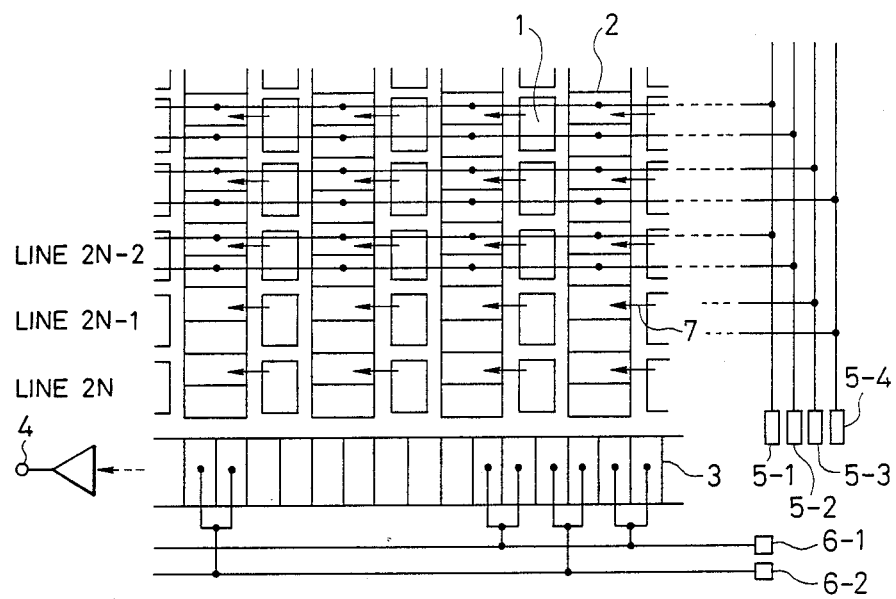
FIGS. 1A and 1B are diagrams showing the construction of a conventional CCD imaging device.
Figure 1B:
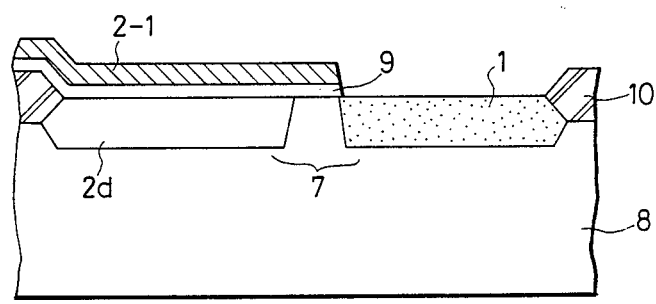
Figure 10:
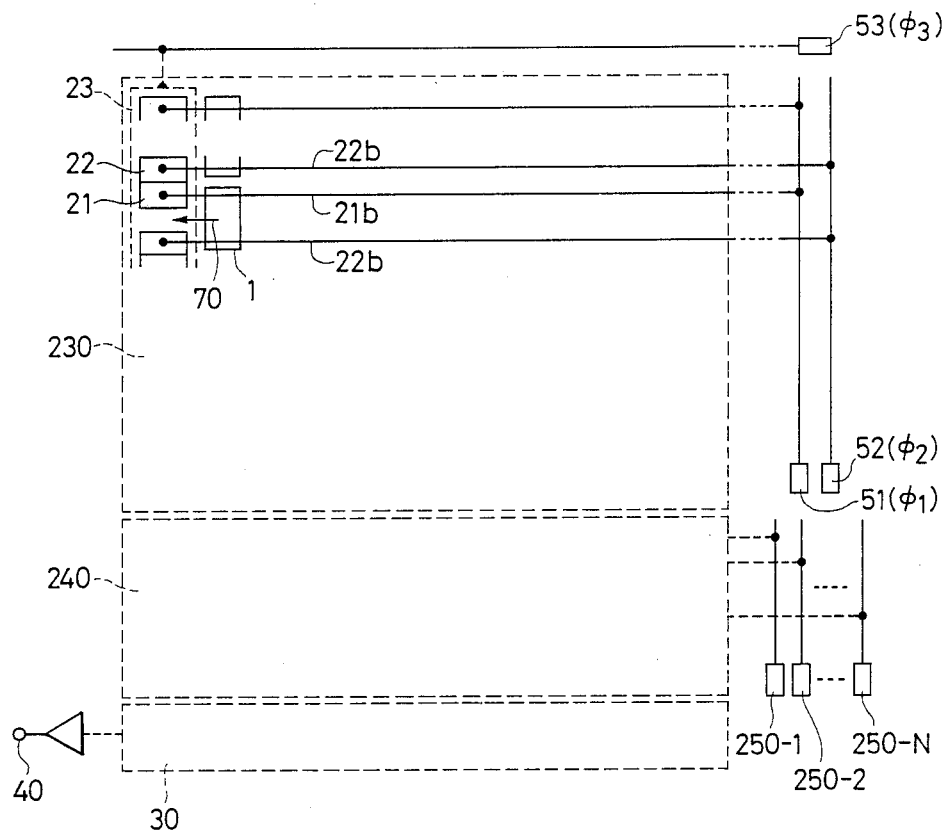
FIG. 10 is a diagram of a still further alternative embodiment of the invention.

The frame-interline type CCD imaging device has been proposed to reduce smear in size (Kuroda et al.: FIT-CCD Imaging Device, Preprints of the Symposium of the Institute of Television Engineers of Japan, 1982, pp. 35-36). In the device proposed above, the signal charge detected in the image area is transferred for temporary storing purposes to the storage area located adjacent to the image area. The smear is reduced in size tens of the times as compared with that of the conventional device shown in FIG. 1A and 1B by transferring the signal charge at a rate tens of times as high as the normal rate. The embodiment of the frame interline type CCD imaging device in which the present invention is incorporated is shown in FIG. 10. The image area is denoted by 230, the storage area by 240, and the horizontal CCD shift register by 30. The vertical CCD shift register which is composed of the electrodes of three layers as shown in FIGS. 3A and 3D and driven by a three-phase clock pulse and the photodiode are located in the image area. On the other hand, the CCD shift register for temporary storage is located in the storage area (photodiode a is unnecessary). This register used for temporary storage may be composed of the electrode of three (or two) layers and driven by the three- (or four-)phase clock pulse as is the case with the image area. In this connection, the character N indicating clock pulse generator 250 denotes the number of phases of clock (N=1, 2, 3, 4, 5,...). The signal charge temporarily stored in the storage area is sent into the horizontal CCD shift register in the same manner as with the embodiment indicated in FIG. 3A. The signals for a set of two rows of photodiodes can be sequentially derived from output terminal 40

As has been explained, the interline type CCD imaging device consisting of three-phase-driven, three-layer-built vertical CCD shift registers which do not produce sensitivity irregularities is obtained by embodying the present invention. The following effects are achievable when the imaging device embodied by the present invention is put to practical use.

(1) The signals are read out in the field from all the rows of photodiodes by the simultaneous two-row readout method. The occurrence of image lag is thus prevented.

(2) The vertical resolution is prevented from being deteriorated. The image quality thus improves because the resolution corresponding to the number of pixels used in the device is obtainable.

(3) The aperture greatly improves. Further, a still higher sensitivity is obtainable because a complementary color filter becomes usable (i.e., moire is prevented from occurring).

(4) The CCD electrode of the third layer doubles as a light shielding film and further the wire extending from this electrode vertically runs in a very simple form. The formed device is thus free of excessive unevenness in shape, and sensitivity irregularities are minimized (i.e., sensitivity does not change from one pixel to another).

Smear is also minimized by the use of the aforementioned light shielding electrode.

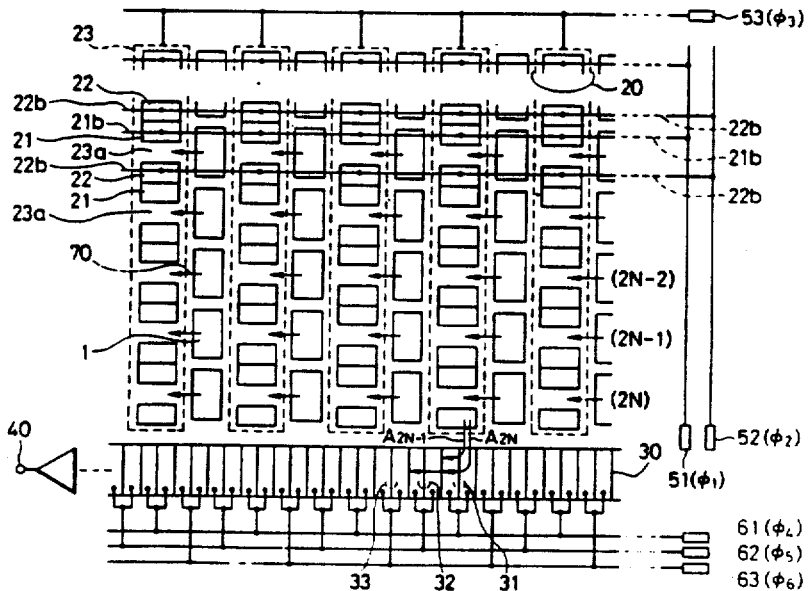

We claim:

1. A solid-state imaging device comprising:
   a plurality of photoelectric conversion elements regularly arranged in horizontal and vertical directions;
   a plurality of vertical charge transfer devices which vertically transfer charges, each of said vertical charge transfer devices being composed of a plurality of sets of three electrodes driven by three-phase pulses;
   a plurality of transfer gates through which a signal charge produced in each photoelectric conversion element in response to incident light is transferred to the channel beneath a predetermined electrode of the vertical charge transfer device;
   horizontal charge transfer means by which signal charges delivered from each vertical charge transfer device are horizontally transferred;
   first and second wires, through which driving pulses are sent into first and second electrodes of said three electrodes in each of said sets, running in the horizontal direction; and
   a third wire, through which driving pulses are sent to the third electrode of said three electrodes, running in the vertical direction;
   wherein said third wire and said third electrode have a shielding effect protecting said vertical charge transfer device against incident light.

2. A solid-state imaging device according to claim 1, wherein said third wire and said third electrode are formed by an opaque metal layer.

3. A solid-state imaging device according to claim 1, wherein said third wire and said third electrode are formed by a double-layer structure consisting of a polycrystalline silicon layer and an opaque silicide layer disposed on the polycrystalline silicon layer.

4. A solid-state imaging device according to claim 1, wherein said third wire and said third electrode are formed by a double-layer structure consisting of a polycrystalline silicon layer and an opaque metal layer disposed on the polycrystalline silicon layer.

5. A solid-state imaging device according to claim 1, wherein each of said plurality of transfer gates includes an electrode, the electrode which is included as part of said transfer gate being composed of two of said three electrodes in each of said sets.

6. A solid-state imaging device according to claim 1, which further includes means for temporarily storing the signal charge between said vertical charge transfer device and said horizontal charge transfer means.

7. A solid-state imaging device according to claim 6, wherein said storage means offers capacity for storing signal charges from the photoelectric conversion elements which are horizontally arranged in one or two rows.

8. A solid-state imaging device according to claim 6, wherein said storage means offers capacity for storing signal charges from the photoelectric conversion element in all the rows.

9. A solid-state imaging device according to claim 1, which further includes a plurality of charge transfer devices which transfer a smear charge.

10. An imaging apparatus comprising:
    a solid-state imaging device which includes,
    a plurality of photoelectric conversion elements regularly arranged in horizontal and vertical directions, a plurality of vertical charge transfer devices which vertically transfer the charges, each of said vertical charge transfer devices being composed of a plurality of sets of three electrodes driven by three-phase pulses, a plurality of transfer gates through which a signal charge produced in each photoelectric conversion element in response to incident light is transferred to the channel beneath a predetermined electrode of the vertical charge transfer device, and horizontal charge transfer means by which signal charges delivered from each vertical charge transfer device are horizontally transferred;

pulse generating means which generates pulses for driving the vertical charge transfer devices, transfer gates, and horizontal charge transfer means;

first and second wires through which driving pulses are sent to first and second electrodes of said three electrodes in each of said sets of three electrodes, the first and second wires running in the horizontal direction; and a third wire through which driving pulses are sent to the third electrode of said three electrodes, the third wire running in the vertical direction;

wherein said third wire and said third electrodes have a shielding effect protecting said vertical charge transfer device against incident light; and wherein said pulse generating means generating the pulses for driving said vertical charge transfer devices and horizontal charge transfer means in such a manner that the signal charges from the photoelectric conversion elements arranged in adjacent two rows, the two-row combination being different between odd- and even-numbered fields, are transferred from said vertical charge transfer devices to said horizontal charge transfer means in the horizontal blanking period, and further the signal charges from said photoelectric conversion elements arranged in adjacent two rows are transferred to their output terminals by said horizontal charge transfer means in the picture signal period subsequent to said horizontal blanking period.

11. An imaging apparatus according to claim 10, wherein the signal charges from the photoelectric conversion elements located nearest said horizontal charge transfer means are transferred from said vertical charge transfer devices to said horizontal charge transfer means in the vertical blanking period of either one of two successive fields, and said signal charges are discharged by said horizontal charge transfer means from their output terminals.

12. An imaging apparatus according to claim 10, wherein the signal charges from the photoelectric conversion elements located in the row farthest from said horizontal charge transfer means are transferred by said vertical charge transfer devices away from said horizontal charge transfer means and discharged from a region where the photoelectric conversion elements are arranged.

13. An imaging apparatus according to claim 10, wherein said horizontal charge transfer means comprises one charge transfer device which separately transfers the signal charges from said photoelectric conversion elements arranged in adjacent two rows.

14. An imaging apparatus according to claim 10, wherein said horizontal charge transfer means comprises two charge transfer devices, one of which transfers the signal charges from the photoelectric conversion elements located in one of said adjacent two rows and the other transfers the signal charges from the photoelectric conversion elements in the other of said adjacent two rows.

* * * * *

UNITED STATES PATENT AND TRADEMARK OFFICE
CERTIFICATE OF CORRECTION

PATENT NO. : 4,774,586

DATED : September 27, 1988

INVENTOR(S) : Koike et al

It is certified that error appears in the above-identified patent and that said Letters Patent is hereby corrected as shown below:

Title Page

The title page showing the illustrative figure should be deleted to appear as per the attached title page.

Signed and Sealed this

Fourteenth Day of January, 1992

*Attest:*

HARRY F. MANBECK, JR.

*Attesting Officer*     Commissioner of Patents and Trademarks

United States Patent [19]
Koike et al.

[11] Patent Number: 4,774,586
[45] Date of Patent: Sep. 27, 1988

[54] INTERLINE TYPE CHARGE TRANSFER IMAGING DEVICE

[75] Inventors: Norio Koike, Suginami; Masaaki Nakai, Tokorozawa; Kenji Itoh, Katsuta; Toshiyuki Akiyama, Kodaira; Iwao Takemoto, Nishitama; Shinya Oba, Tsukui, all of Japan

[73] Assignee: Hitachi, Ltd., Tokyo, Japan

[21] Appl. No.: 768,113

[22] Filed: Aug. 21, 1985

[30] Foreign Application Priority Data

Aug. 24, 1984 [JP] Japan .................. 59-174923

[51] Int. Cl.$^4$ .............................. H04N 3/14
[52] U.S. Cl. .................... 358/213.29; 358/213.22; 357/30; 357/24
[58] Field of Search ............ 358/213.22, 213.26, 358/213.29, 213.31; 357/24 LR, 30 D, 30 H

[56] References Cited

U.S. PATENT DOCUMENTS

| | | | |
|---|---|---|---|
| 4,514,765 | 4/1985 | Miyata et al. | 358/213.22 |
| 4,559,550 | 12/1985 | Koike et al. | 357/24 |
| 4,617,595 | 10/1986 | Berger | 358/213.26 |
| 4,620,231 | 10/1986 | Kosonocky | 358/213.26 |
| 4,638,362 | 1/1987 | Oshima et al. | 358/213.26 |
| 4,656,519 | 4/1987 | Savoye | 357/24 LR |
| 4,689,687 | 8/1987 | Koike et al. | 358/213.29 |

FOREIGN PATENT DOCUMENTS

| | | |
|---|---|---|
| 3104489 | 12/1981 | Fed. Rep. of Germany |
| 3226732 | 2/1983 | Fed. Rep. of Germany |
| 3302725 | 8/1983 | Fed. Rep. of Germany |
| 3340338 | 5/1984 | Fed. Rep. of Germany |
| 3104455 | 2/1985 | Fed. Rep. of Germany |

Primary Examiner—Jin F. Ng
Assistant Examiner—Stephen Brinich
Attorney, Agent, or Firm—Antonelli, Terry & Wands

[57] ABSTRACT

In the interline type charge transfer imaging device, two of the three groups of wiring through which driving pulses are sent to each of three groups of electrodes constituting vertical charge transfer devices are arranged in horizontal direction and the remaining one group of wiring is arranged in vertical direction. Light-shielding layer is installed on the vertically running wires and the electrodes connected with those wires.

14 Claims, 14 Drawing Sheets